United States Patent
Borchardt et al.

(10) Patent No.: US 8,595,095 B2
(45) Date of Patent: Nov. 26, 2013

(54) FRAMEWORK FOR INTEGRATED STORAGE OF BANKING APPLICATION DATA

(75) Inventors: Andreas S Borchardt, Eppelheim (DE); Dirk Endesfelder, Heldelberg (DE); Ralf M Handl, Heidelberg (DE); Michael Hladik, Walldorf (DE); Roland Kolata, Walldorf (DE); Ekkehard Lange, Karlsruhe (DE); Christoph Meinel, Heidelberg (DE); Frank Raebiger, Bammental (DE)

(73) Assignee: SAP AG, Walldorf (DE)

( * ) Notice: Subject to any disclaimer, the term of this patent is extended or adjusted under 35 U.S.C. 154(b) by 1474 days.

(21) Appl. No.: 11/444,700

(22) Filed: May 31, 2006

(65) Prior Publication Data
US 2007/0288374 A1 Dec. 13, 2007

(51) Int. Cl.
*G06Q 40/00* (2012.01)

(52) U.S. Cl.
USPC ............. 705/35; 707/790; 707/802; 707/809; 707/811

(58) Field of Classification Search
USPC ......... 705/1, 35, 42, 39–40, 30; 707/1, 100, 4
See application file for complete search history.

(56) References Cited

U.S. PATENT DOCUMENTS

| 5,864,857 A * | 1/1999 | Ohata et al. ............... 707/100 |
| 6,587,441 B1 * | 7/2003 | Urban et al. ................ 370/310 |
| 2007/0038648 A1 * | 2/2007 | Chetwood et al. ............ 707/100 |

OTHER PUBLICATIONS

Data Archiving at the U.S. Central Bank, Linda F. Powell, IASSIST Quarterly, Winter 2004, found online at http://www.iassistdata.org/downloads/igvol284powell.pdf.*
SAS Institute Inc. 2005. SAS® Detail Data Store for Banking 2.0: Implementation and Administration Guide, Second Edition, Cary, NC: SAS Institute Inc., Mar. 2005.*

* cited by examiner

*Primary Examiner* — Olabode Akintola
*Assistant Examiner* — Kellie Campbell
(74) *Attorney, Agent, or Firm* — Kenyon & Kenyon LLP

(57) ABSTRACT

In a banking application system including numerous banking applications, a data management framework allows for the generalized storage and subsequent access of result data. Through the application of the framework to the raw processing data generated by one of the banking applications, the result data is stored in a general storage location. Through this framework, the data is then readily accessible by all other banking applications. This framework includes a header field, characteristics data and key figure data. This removes proprietary restrictions on the data itself and thus makes it available to the other applications, increasing cross-system efficiency by allowing other applications to access and subsequently use the result data.

12 Claims, 3 Drawing Sheets

FRAMEWORK FOR INTEGRATED STORAGE OF BANKING APPLICATION DATA

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND

In banking applications, there are many levels of data production and analysis. Concurrent with the growth of banking applications, including accounting software systems, there has been the growth of additional requirements on the users and the financial data itself. For instance, as the account principles grow, such as found with Generally Accepted Accounting Principles (GAAP), there are further demands on the financial data. In another example, regulatory bodies for certain types of users have increased the accounting demands, such as found with the Sarbanes Oxley regulations, commonly referred to as SOX.

The multi-component banking/financial software processing systems include different functionalities that produce data specific to the associated functions. Additionally, these systems then store and are capable of performing further analysis on this data. For example, an invoice application may collect various accounting data and thereupon assemble a time-specific spreadsheet such as a balance sheet.

This same exemplary processing application may save this data as well as the generated work product. By way of sample nomenclature, the application may save this data as historical data. In the accounting processing system, memory locations are designated to store this specific historical data.

In the normal course of operation, the invoice application may readily access this historical data. The data, while stored in the central location, is significantly restricted to the invoice application or applications directly associated therewith. For example, directly associated applications may include a more general application that includes the invoice application functionality. But the nature of the current financial and banking operating systems is that this data is not available outside of this specific usage based on its creation by the application.

In these banking applications, stored data becomes formatted or contextually associated with specific applications due to the nature in which the data is generated and stored in the system. Using the example of the invoice application, the data is processed and thus formatted relative to the invoice application.

Thereupon, for this data to be usable in another application or system, the data must be converted. Typically, this process requires one of two techniques. A first technique is to generate a specific translation between the original application and a format usable by the second application. A second technique includes translating the data to a generalized format and then translating again to the format usable by the second application.

In the first technique, this requires a specific translation or interface between these two applications. The second technique similarly requires the development of translators between the various data encodings. Both techniques are expensive and time consuming. In current banking applications, significant valuable resources are employed using the above techniques to make the data available between systems. This not only reduces computational ability of the banking system, but also significant reduces the variety of cross-data analysis operations.

By way of a specific example, under the current banking applications, a user would find it extremely difficult to utilize existing invoice data for a secondary analysis of financial risks. For example, in invoice information there may be the requisite information for performing the analysis to calculate a party's credit risks. Under existing systems, the invoice data would have to be fully translated between the invoice application encoding to be made available for a credit risk analysis. This would require one or more levels of translation and this procedure would be applicable only to the data itself. Should the credit risk analysis require further information from other applications, such as possibly from an account balance system, this data would also require full translation.

Therefore, under the current system, the data is essentially unusable outside of the base application or functionality that created it. As further demands are placed on accounting information by not only users but also regulatory (e.g. SOX) requirements, current systems are unable to efficiently use existing data for additional process operations or calculations outside of the original use.

DETAILED DESCRIPTION

In a banking application system including numerous banking applications, a data management framework allows for the generalized storage and subsequent access of result data. Through the application of the framework to the result data generated by one of the banking applications, the result data is stored in a general storage location. Through this framework, the data is then readily accessible by all other banking applications. This framework removes proprietary restrictions on the data itself and thus makes it available to the other applications, thereby increasing cross-system efficiency by allowing other applications to access and subsequently use the result data.

Figure 1:
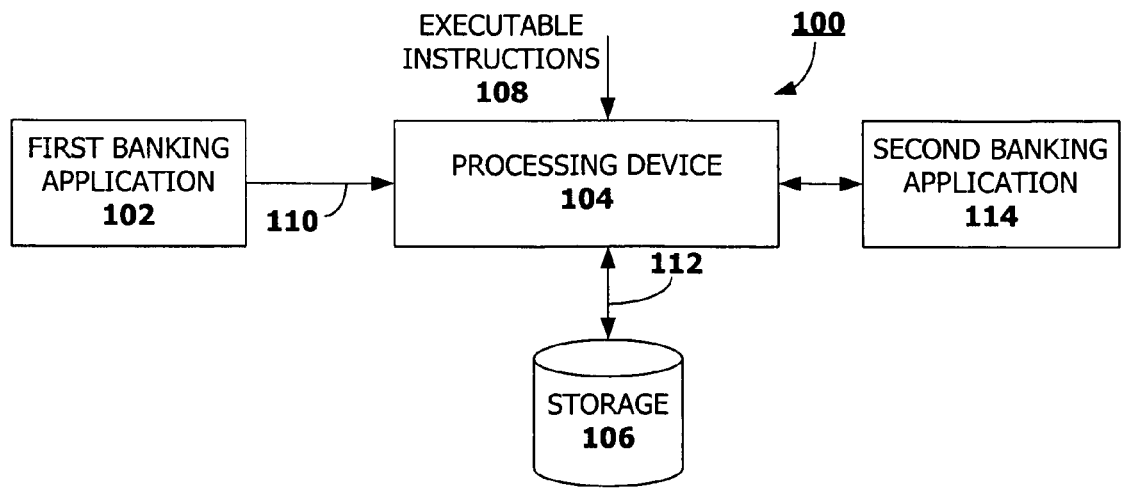
FIG. 1 illustrates a block diagram of one embodiment of a banking processing system including a framework for the integrated storage of banking application data.

FIG. 1 illustrates a processing system 100 including a first banking application 102, a processing device 104, and a storage device 106. The first banking application 102 may be a software application executable within a banking application system that uses banking data and thereupon generates resultant data. For example, the banking application 102 may generate calculations of profit figures for a financial institution using a profit application. In another example, the banking application 102 may generate risk figures for the financial institution using a risk application.

The processing device 104 may be one or more processing elements capable of performing processing steps in response to executable instructions 108. The storage device 106 may be one or more storage elements coupled to the processing device 104 and operative to store data therein. Additionally, as described in further detail below, the storage 106 is also accessible for the subsequent data retrieval therefrom.

In one embodiment, the first banking application 102 generates raw processing data 110. This data 110 is generated based on normal computation techniques using a standard banking application 102. The processing device 104 then performs processing steps based on the executable instructions 108. As discussed in further detail below, the processing device 104 receives the raw processing data 110 from the first banking application 102. The processing device 104 generates a header field, characteristics data and key figure data based on the type of raw processing data 110. The processing device 104 thereupon assigns the header field, the characteristic data and the key figure data to generate the result data 112, which is then stored in the storage device 106.

The result data 112 is stored based on this designated framework. The framework allows for any other application to similarly retrieve the result data 112. Whereas previous systems required translation of the result data between the first banking application and the second banking application, the processing device 104, through the framework, makes the data readily available. Translation was previously needed because, among other reasons, the second application did not have an understanding of where the data is stored.

Therefore, in this banking system 100, a second banking application 114 may effectively retrieve information from the storage device 106. In one embodiment, through the processing device 104, the second banking application 114 retrieves the result data based on the header field, characteristics data and key figure data. As the data is stored in the storage device 106 based on this information, it is equally accessible for the second banking application to retrieve this information using the same framework technique, as discussed in further detail below. As such, in this system 100, the second banking application 114 now has direct access to the raw processing data being stored as result data generated by the first banking application 102.

Figure 2:
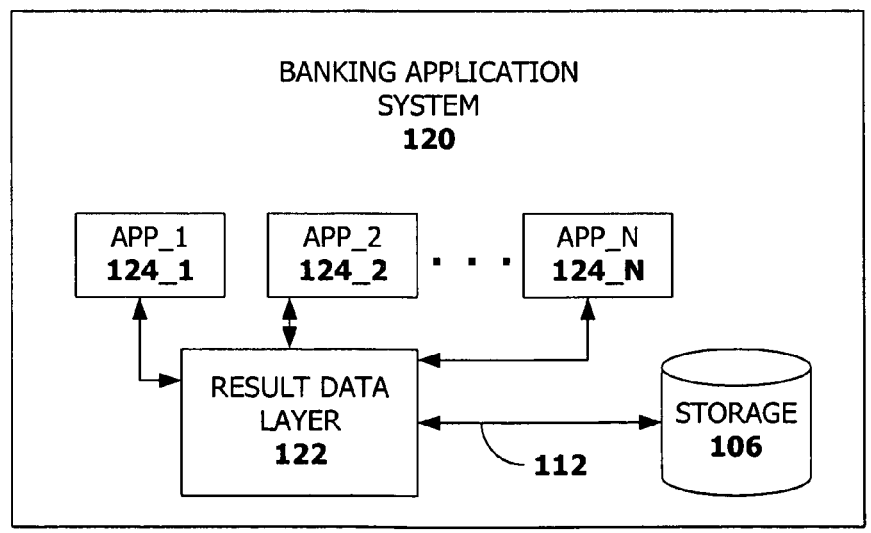
FIG. 2 illustrates a block diagram of one embodiment of a banking application system.

FIG. 2 illustrates a block diagram of a banking application system 120. These systems 120 include any number of banking applications 124. As illustrated in FIG. 2, the system includes a first application 124_1, a second application 124_2, and an N numbered application, 124_N, (collectively referred to as 124) where N is any suitable integer value.

The banking application system 120 also includes a result data layer 122 and the storage device 106. It is recognized that many elements of the banking application system 120, for example interfacing and other processing components, have been omitted for clarity purposes only.

The result data layer 122 may be a part of an integrated finance and risk architecture. The result data layer may serve as an integration cornerstone for the storage of result data, providing a centralized infrastructure and business semantics, which enable access to results by requesters other than the supplier of the results. The result data layer 122 in effect moves ownership of results away from analytical components that create the results and stresses the multi-purpose aspects of specific results based on a common understanding of the semantic of the results.

In the banking application system 120, the result data layer 122 is in communication with the different applications 124. The result data layer 122 provides the framework for the storage of result data 112 to the storage 106. Additionally, the same storage technique allows for the retrieval of data.

Figure 3:
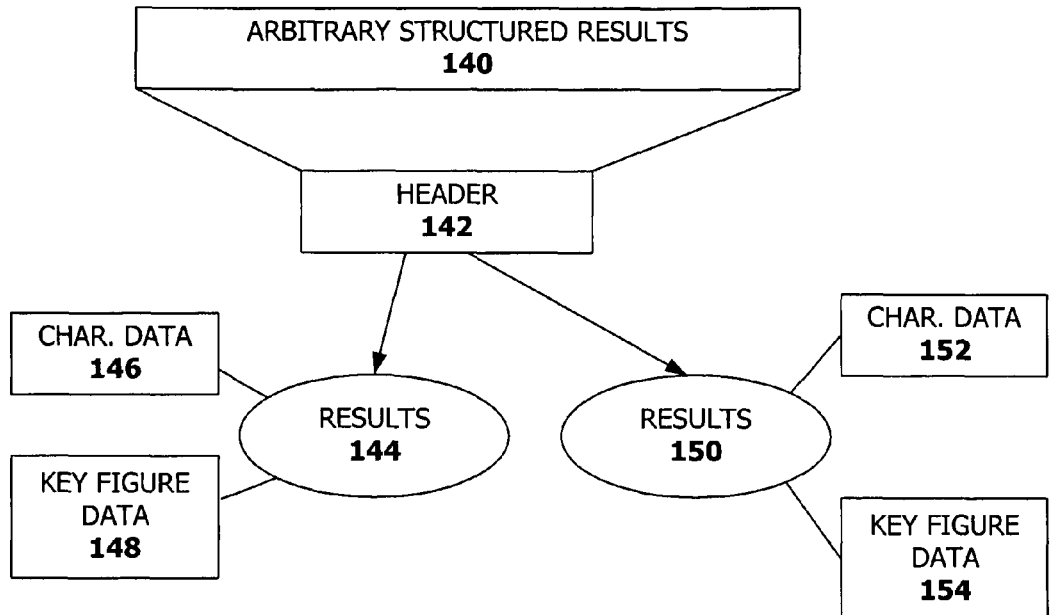
FIG. 3 illustrates a graphical diagram of one embodiment of a framework allowing for integrated storage of banking application data.

For example, FIG. 3 illustrates a graphical representation of the framework for arbitrary structure results 140 of result data 144. This data 144 is assigned header information 142 based on the type of data. For example, if the data is financial risk data, the header may indicate that information as such.

The result data is also assigned further information beyond the header information 142, including characteristics data 146 and key figure data 148. The characteristics data 146 indicates various characteristics of the data, for example if the data indicates risk information for a particular aspect of a business. The key figures data 148 may indicate key figures included within the data itself, such as the example of risk data, the key figure data 148 may include an identifier that the data includes risk information for a particular period of time, for example.

As illustrated in FIG. 3, this framework of the structured results 140 is applicable to different result data 150. Similar data may be assigned the same header 142, but varying characteristics data 152 and key figure data 154. The variances in the header 142, characteristic data 152 and key figure data 154 allow for the categorization of the result data and similarly allow for the subsequent retrieval. In the framework, the same technique for categorizing the result data allows for its subsequent retrieval. Banking applications, such as the ones that did not create the result data, may find the requested information based on the framework. For example, if a profit application wishes to retrieve result data from a risk application, the framework can determine the proper result data based on the arbitrary structured results 140.

Using the same example as discussed above, if the requested result is risk data, the header 142 may indicate that it is risk data. The requested result data may also be found based on the characteristics data and/or key figure data. For example, the profit application may request result data based on a specific characteristic, such as a particular business aspect. Additionally, the profit application may request result data based on key figure data, such as a key risk figure computed in the result data, for example key figures to a particular time, such as a fiscal quarter or year. Through this framework, such as illustrated in FIG. 3, result data can be generally stored and subsequently made available for retrieval by applications that did not originally generate the data.

Figure 4:
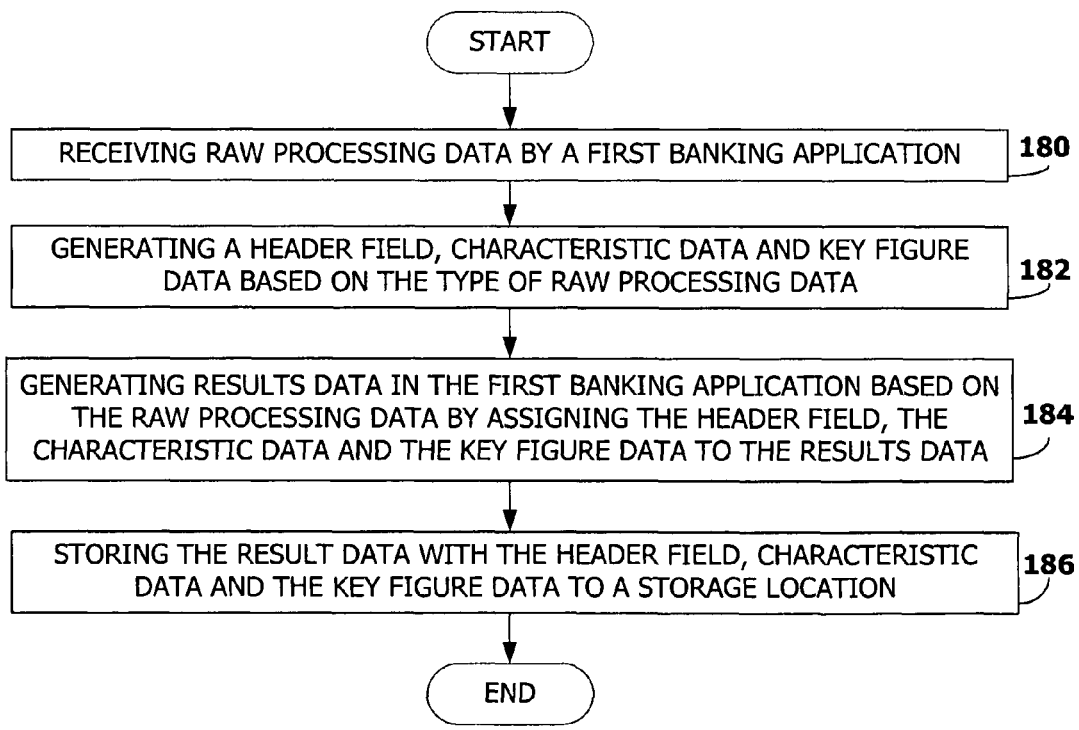
FIG. 4 illustrates a flowchart of the steps of one embodiment of a method for integrated storage of banking application data.

FIG. 4 illustrates a flowchart of the steps of one embodiment of a method for the integrated storage of banking application data. The processing device 104 of FIG. 1 as a part of the framework for the integrated storage of banking application data may perform this method. In one embodiment, the first step, step 180, is receiving raw processing data by a first banking application. This raw processing data may be data within the banking application system, such as from a central storage location or data specific to the first banking application itself. For example, if the application is a risk analysis application, the raw processing data may be retrieved from a central storage of all financial data.

In this embodiment, the next step, step 182, is generating a header field, characteristic data and key figure data based on the raw processing data. The raw processing data is generated by the first banking application, such as computing risk calculations in a risk assessment banking application. As discussed above, the header field, characteristic data and key figure data are generated based on the raw processing data to indicate the type and content of the raw processing data itself.

The next step, step 184, is generating result data in the first banking application based on the raw processing data by assigning the header field, the characteristics data and the key figure data to the result data. This result data is the combination of the raw processing data in the generated framework of the header field, characteristics data and result data. As described above, this data in the framework defines the context of the raw processing data. Therefore, the next step, step 186, is storing the result data with the header field, characteristic data and the key figure data to a storage location.

In this embodiment, the method is complete. Although, additional embodiments may also include the step of defining numerous result data areas and generating the characteristics as common dimensions per the result data area, where these characteristics are part of all result types within the result data. In a further embodiment, the method may include defining numerous result data types for each of the result data areas. Additionally, in one embodiment, each of the key figure data which is assigned to a result type can be assigned only once to a result type within the result data area of the result type.

Figure 5:
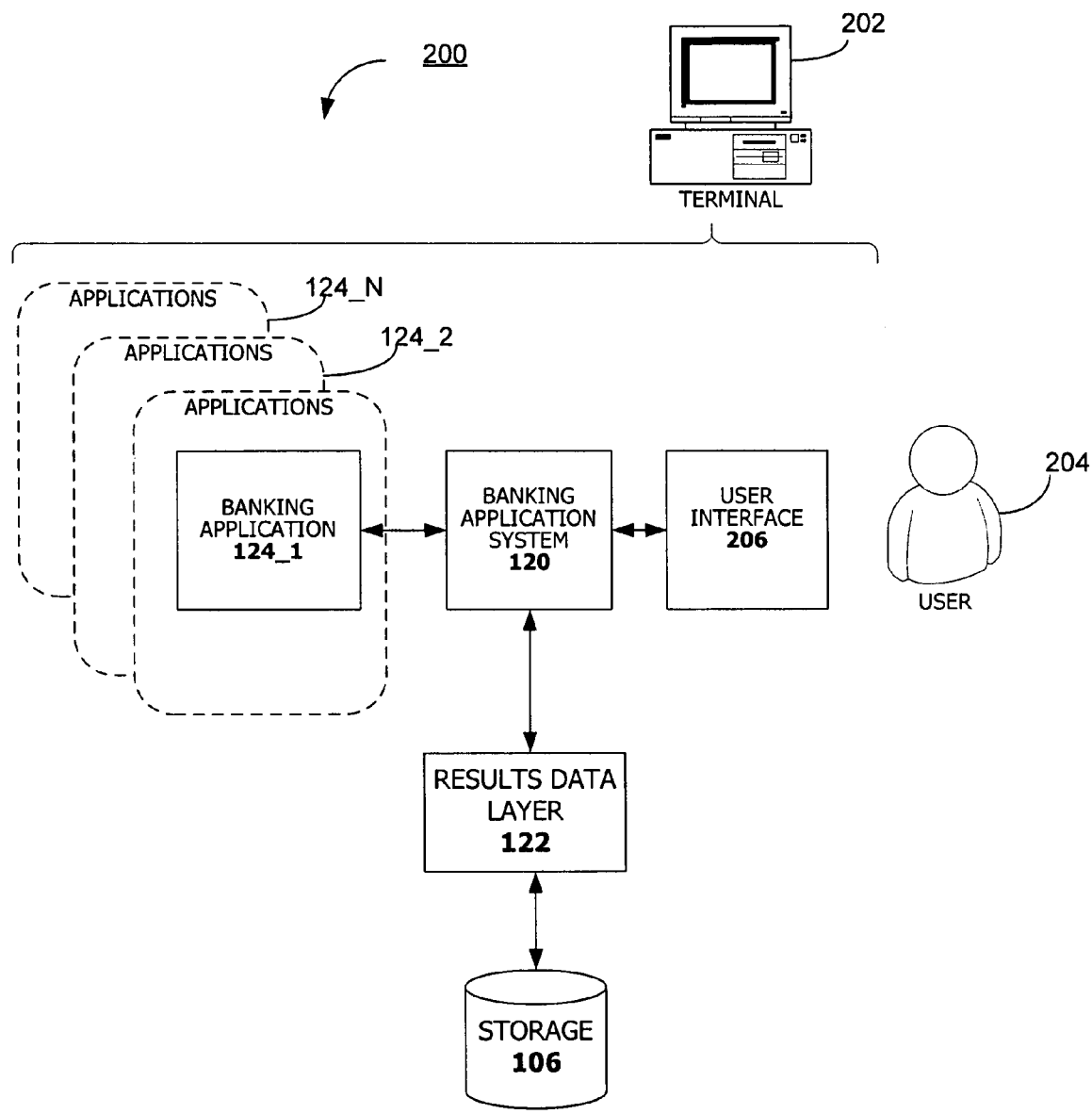
FIG. 5 illustrates a block diagram of a processing environment including the banking processing system allowing for integrated storage of banking application data.

FIG. 5 illustrates a block diagram of a processing environment 200 including a terminal 102 or other type of computing device. A user 204, through a user interface 206, accesses the banking application system 120. The banking application system 120 operates with any number of banking applications 124, each including a banking engine 210.

The banking application system 120 is also coupled to the result data layer 122 and the storage device 106. The terminal 202 may be a stand alone computing system or may be operative within the networked computing environment, where the applications 124, the banking application system 120, the result data layer 122 and/or the storage device 106 can be disposed locally or remotely accessible.

Through the system 200, the user 204 operates the banking application system 120 to perform various functions as available through the applications 124. The user 200 accesses the banking application system 120 through the interface 206 and the banking application system 120 includes various levels of functionality to not only manage the different applications 120 but also manage the raw processing data and subsequently the result data processed through the framework of the result data layer and stored in the semantically integrated format in the storage 106.

Therefore, this system provides universal ownership of raw processing data. This data is generally categorized based on the different noted characteristics and stored accordingly. These same characteristics allow for the subsequent retrieval by other banking applications, allowing for a generalized and cross-application usage of the banking application data without requiring translations or other cost-prohibitive operations for sharing information across these previously data-incompatible banking applications.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. A computer-implemented method for integrated storage of banking application data, the method comprising:
   receiving, by a processing device, raw processing data generated by a first banking application, wherein the raw processing data includes formatting and proprietary information from the first banking application;
   removing, by the processing device, the formatting and proprietary information on the raw processing data from the first banking application producing clean raw processing data;
   generating, by the processing device, a header field, characteristics data and key figure data based on the type and content of the clean raw processing data, wherein characteristic data corresponds to at least one characteristic of the clean raw processing data and key figure data corresponds to at least one key figure included in the clean raw processing data;
   converting, by the processing device, the clean raw processing data into result data by:
   assigning the header field to the result data; and
   assigning the characteristic data and the key figure data to the result data;
   designating, by the processing device, a framework to the result data based on the assigned header field, characteristic data, and key figure data, wherein the framework is independent of the first banking application;
   storing, by the processing device, the result data with the header field, characteristic data and the key figure data to a storage location in a semantically integrated format according to the designated framework, wherein all data stored in the storage location is stored in the semantically integrated format and all data in the storage location is stored according to designated frameworks;
   receiving, by the processing device, a search request by a second banking application, the search request based on one or combination of search domains including header information, characteristic information, and key figure information;
   matching, by the processing device, the search request to the result data based on the search request and the designated framework of the result data; responsive to the matching, retrieving, by the processing device, the clean raw processing data from the result data, and
   transmitting, by the processing device, the clean raw processing data to the second banking application, wherein the second banking application adds formatting and proprietary information of the second banking application to the clean raw processing data.

2. The computer-implemented method of claim 1 further comprising:
   defining, by the processing device, a plurality of result data areas; and
   generating, by the processing device, the characteristics as common dimensions per the result data area, wherein these characteristics are part of all result types within the result data area.

3. The computer-implemented method of claim 2 further comprising:
   defining, by the processing device, a plurality of result data types for each of the result data areas.

4. The computer-implemented method of claim 3 wherein when the key figure data is assigned to one of the plurality of result data types, the key figure data is assigned to only one result data type in the result data area of the result data type.

5. A non-transitory computer readable storage medium storing a set of instructions that when executed by a processing device performs a method comprising:

receiving raw processing data generated by a first banking application, wherein the raw processing data includes formatting and proprietary information form the first banking application;

removing the formatting and proprietary information on the raw processing data from the first banking application producing clean raw processing data;

generating a header field, characteristics data and key figure data based on the type and content of the clean raw processing data, wherein characteristic data corresponds to at least one characteristic of the clean raw processing data and key figure data corresponds to at least one key figure included in the clean raw processing data;

converting the clean raw processing data into result data by:

assigning the header field to the result data; and assigning the characteristic data and the key figure data to the result data;

designating a framework to the result data based on the assigned header field, characteristic data, and key figure data, wherein the framework is independent of the first banking application;

storing the result data with the header field, characteristic data and the key figure data to a storage location in a semantically integrated format according to the designated framework, wherein all data stored in the storage location is stored in the semantically integrated format and all data in the storage location is stored according to designated frameworks;

receiving a search request by a second banking application, the search request based on one or combination of search domains including header information, characteristic information, and key figure information;

matching the search request to the result data based on the search request and the designated framework of the result data;

responsive to the matching, retrieving the clean raw processing data from the result data; and transmitting the clean raw processing data to the second banking application, wherein the second banking application adds formatting and proprietary information of the second banking application to the clean raw processing data.

6. The non-transitory computer readable storage medium of claim 5 wherein the processing device performs the further processing steps:

defining a plurality of result data areas; and generating the characteristics as common dimensions per the result data area, wherein these characteristics are part of all result types within the result data area.

7. The non-transitory computer readable storage medium of claim 6 wherein the processing device performs the further processing steps:

defining a plurality of result data types for each of the result data areas.

8. The non-transitory computer readable storage medium of claim 7 wherein when the key figure data is assigned to one of the plurality of result data types, the key figure data is assigned to only one result data type in the result data area of the result data type.

9. A bank processing system comprising:

a program memory;

a storage location;

a processor coupled to the program memory and the storage location, wherein the processor is configured to execute instructions to:

receive raw processing data generated by a first banking application, wherein the raw processing data includes formatting and proprietary information from the first banking application;

remove the formatting and proprietary information on the raw processing data from the first banking application to produce clean raw processing data;

generate a header field, characteristics data and key figure data based on the type and content of the clean raw processing data, wherein characteristic data corresponds to at least one characteristic of the clean raw processing data and key figure data corresponds to at least one key figure included in the clean raw processing data;

convert the clean raw processing data into result data by:

assign the header field to the result data; and assign the characteristic data and the key figure data to the result data;

designate a framework to the result data based on the assigned header field, characteristic data, and key figure data, wherein the framework is independent of the first banking application;

store the result data with the header field, characteristic data and the key figure data to the storage location in a semantically integrated format according to the designated framework, wherein all data stored in the storage location is stored in the semantically integrated format and all data in the storage location is stored according to designated frameworks;

receive a search request by a second banking application, the search request based on one or combination of search domains including header information, characteristic information, and key figure information; match the search request to the result data based on the search request and the designated framework of the result data;

responsive to the matching, retrieve the clean raw processing data from the result data; and transmit the clean raw processing data to the second banking application, wherein the second banking application adds formatting and proprietary information of the second banking application to the clean raw processing data.

10. The system of claim 9, the processor is further configured to:

define a plurality of result data areas; and generate the characteristics as common dimensions per the result data area, wherein these characteristics are part of all result types within the result data area.

11. The system of claim 10, the processor is further configured to:

define a plurality of result data types for each of the result data areas.

12. The system of claim 11 wherein when the key figure data is assigned to one of the plurality of result data types, the key figure data is assigned to only one result data type in the result data area of the result data type.

* * * * *